United States Patent Office 2,961,441
Patented Nov. 22, 1960

2,961,441

PROCESS FOR PRODUCING 6β-FLUOROSTEROIDS

Virgil V. Bogert, Garden City, and Barry M. Bloom, Kew Gardens, N.Y., assignors to Chas. Pfizer & Co., Inc., Brooklyn, N.Y., a corporation of Delaware No Drawing. Filed Aug. 7, 1959, Ser. No. 832,171

6 Claims. (Cl. 260—239.55)

This invention is concerned with a process for producing 6-fluorosteroids. More particularly it is concerned with the synthesis of 6-fluoro-3-keto-$\Delta^4$-pregnenes, androstenes, cholestenes and sapogenins from corresponding 3-keto-$\Delta^4$-steroids by reaction with perchloryl fluoride.

6-fluorosteroids are well known effective therapeutic agents which may be of either the 6α-fluoro or 6β-fluoro configuration. The former possess particularly valuable therapeutic properties and the latter are especially useful as intermediates in the synthesis of the former. 6-fluorosteroids have been synthesized in the past by means of costly, multi-step processes which are not desirable for industrial purposes. The present process provides an economical, comparatively facile process for the commercial production of 6-fluorosteroids.

It has been reported in the literature that 2α-fluorohydrocortisone has been prepared by the reaction of perchloryl fluoride and the sodium salt of 20-ethylenedioxy-2-methoxyalyl-11β,17α,21-trihydroxy-4-pregnen-3,20-dione followed by cleavage of the methoxyalyl group and hydrolysis of the resultant product.

It has now been surprisingly found that 6β-fluorosteroids may be prepared by reaction of perchloryl fluoride with a 3-enol ester of a 3-keto-$\Delta^4$-steroid. The present process, as hereinafter described, results in the introduction of a 6β-fluoro group with the simultaneous removal of the 3-enol substituent to afford a 6β-fluoro-3-keto-$\Delta^4$-steroid. The resulting steroid products may then be converted to the epimers, 6α-fluoro-3-keto-$\Delta^4$-steroid by known methods.

The instant process is accomplished by merely contacting an enol ester of the selected 3-keto-$\Delta^4$-steroid with perchloryl fluoride in a reaction inert organic solvent in the presence of a catalyst for the reaction. The ratio of reactants should be at least equimolar to obtain substantial amounts of product as can be appreciated by those skilled in the art. Large excesses of perchloryl fluoride (up to 2000% excess and higher) have been employed but provide no appreciable advantage. The reaction is initiated almost instantaneously on contacting the reagent with steroid and is generally complete in as little as 10–15 minutes although it is at times preferred to employ longer reaction time, particularly if the selected steroid starting compound has a limited solubility in the reaction solvent system.

By "reaction inert organic solvent" as employed herein is meant an organic solvent which does not react with the starting compounds under the conditions of the present process and does dissolve the reactants. A minimum of laboratory experimentation will enable the selection of suitable solvents. A variety of such solvents are available and include alcohols such as lower alkanols, e.g. methanol, ethanol and propanol, lower alkanones, e.g. acetone and methyl ethyl ketone, dioxane, tetrahydrofuran, lower alkyl ethers of ethylene glycol, diethylene glycol, etc., e.g. dimethyl ether of ethylene glycol and diethylene glycol, and the like.

A catalyst must be present in the reaction mixture to effect the valuable present process. The catalyst for the present reaction may be generally defined as a weakly basic nucleophilic agent. Although a large number of such catalysts may be employed in the present process, the preferred catalysts are water; hydrocarbon tertiary amines such as pyridine, trialkylamines, advantageously lower alkyl amines, such as triethylamine, trimethylamine, etc., N-alkyl nitrogen heterocyclics, such as N-alkylpiperidine, N-alkylmorpholine, N-alkylpyrrollidine, etc., N,N-dimethylbenzylamine, etc.; metal salts of organic carboxylic acids preferably alkali metal (Na, K, Li) salts of lower alkanoic acids such as acetic, propionic, butyric, etc.; and the like. Of course, the catalyst selected should not react with the steroid starting compound to cause a change in the structure either by degradation or other permanent chemical alteration of same. Other suitable catalysts for the present process are readily determinable by routine experimentation involving small-scale runs of the present process. For example, 250 mg. of the steroid starting compound are added to 5 ml. of solvent (acetone) containing at least an equivalent amount of catalyst and perchloryl fluoride is bubbled through the reaction mixture. The presence of 6β-fluoro-steroid may then be determined by paper chromatographic analysis and/or ultraviolet absorption analysis. For paper chromatographic analysis, a variety of known systems may be routinely employed depending on the nature of the steroid starting compound. The 6β-fluorosteroid shows a different mobility than the starting compound and is thus easily detectable. Ultraviolet absorption analysis shows a λ max. at or about 233 mμ for the 6β-fluoro-steroid which differentiates it from the starting compound. The extinction coefficient also differs markedly, that of the 6β-fluorosteroid generally being considerably lower.

It has been found that at least an equivalent amount of catalyst is required to give substantial yield of product. Generally, it is preferred to use at least a 100% excess of catalyst for best results. Extremely large excesses of catalyst may be used without appreciably altering yield of product. Of course, where the catalyst is liquid, e.g. water, the large excess may serve as solvent for the reaction. When water is used as both catalyst and solvent, it is preferred to add a water-soluble organic solvent to provide a more intimate contact of the starting compounds. As is well known, the steroid starting compounds have a limited solubility in water which may necessitate extremely long reaction time, which is obviously not preferred. It is preferred that the percentage by volume of water not exceed 75% based on the total volume of the reaction time.

Temperature does not appear to be critical in the present process. The reaction proceeds at temperatures as low as −30° C. However, temperatures higher than 50° C. are not recommended since their use provides no appreciable advantage and may lead to secondary competing reactions which cause substantial lowering of the yield of desired product.

The fluorinating agent, perchloryl fluoride, may be used in the liquid or gaseous form as desired. In this regard, it may be added to the reaction mixture all at once or portionwise, e.g. dropwise, when liquid, or by delivery tube, when gaseous. The reaction may be carried out at atmospheric or superatmospheric pressure as desired. Since pH of the reaction mixture tends to decrease, a buffer may be added to maintain near-neutrality. However, buffers are not essential to the instant process.

After the reaction is complete, the products are obtained by conventional isolation procedures, e.g. filtration, centrifugation. If the steroid product is soluble it may be precipitated by the addition of a non-solvent, e.g. water, hexane, benzene, etc. The products may be purified by recrystallization or column chromatographic techniques.

The starting materials for the present process are enol esters of known compounds which are obtained by a variety of procedures described in the chemical literature. The 3-keto-$\Delta^4$-steroids used as starting materials are 1,2,6,7-tetrahydro-$\Delta^4$-pregnen-3-ones, 1,2,6,7-tetrahydro-$\Delta^4$-androstene-3-ones, 1,2,6,7-tetrahydro-3-keto-$\Delta^4$-cholestenes and 1,2,6,7-tetrahydro-3-keto-$\Delta^4$-sapogenins which may be substituted with a variety of groups. For example, they may contain hydroxy and acyloxy groups at the 11$\alpha$,11$\beta$,12,14,16,17,18,19 and/or 21-positions; keto groups at the 11,12,17 and/or 20-positions; halogen groups at the 2,7,8,9,12,14,15,16,17,18,19 and/or 21-positions; methyl groups at the 2,7,9,12,14,15,16,17 and 21-positions. It is also intended to include the corresponding dehydro compounds e.g. 9,(11); 11,(12); 14,(15); 16,(17); and/or 17,(20) dehydro compounds. The starting 3-keto-$\Delta^4$-steroids may also contain epoxy groups at the 9,11; 11,12; 14,15; 16,17; 17,20; and the 21,21$\alpha$-positions, and acetal or ketal groups at the 17 or 20-positions.

Among the compounds which are intended as suitable starting compounds for this novel process are the following, in the form of their corresponding 3-enol esters:

$\Delta^4$-androstene-3,11,17-trione
$\Delta^4$-androsten-17$\beta$-ol-3-one (testosterone)
19-nortestosterone
$\Delta^4$-androsten-3,17-dione
$\Delta^4$-androsten-17$\alpha$-ol-3-one
$\Delta^4$-pregnen-3,20-dione (progesterone)
$\Delta^4$-pregnen-11$\beta$,17$\alpha$,21-triol-3,20-dione (hydrocortisone)
$\Delta^4$-pregnen-17$\alpha$,21-diol-3,11,20-trione (cortisone)
$\Delta^4$-pregnen-17$\alpha$,21-diol-3,20-dione (Compound S)
$\Delta^{4,9(11)}$-pregnadiene-17$\alpha$,21-diol-3,20-dione
16$\alpha$,17$\alpha$-oxido-$\Delta^4$-pregnen-21-ol-3,20-dione
$\Delta^4$-androsten-17$\alpha$-ol-3-one
16$\alpha$,17$\alpha$-oxidoprogesterone
9$\alpha$-fluorocortisone
$\Delta^{9(11)}$-progesterone
16$\alpha$-fluorocortisone
16$\alpha$-methylcortisone
$\Delta^4$-pregnen-21-ol-3,20-dione (11-deoxycorticosterone)
9$\beta$,11$\beta$-oxido-$\Delta^4$-pregnen-16$\alpha$,17$\alpha$,21-triol-3,20-dione
2$\alpha$-methyl-9$\beta$,11$\beta$-oxido-$\Delta^4$-pregnen-17$\alpha$,21-diol-3,20-dione
$\Delta^{4,17(20)}$-pregnadien-21-ol-3-one
17$\beta$ - pyruvoyl-$\Delta^4$-androsten-17$\alpha$-ol-3,11-dione (described in copending application Serial No. 740,600, filed June 9, 1958)
17$\alpha$-hydroxyprogesterone
9$\alpha$-bromo-$\Delta^4$-pregnen-3,11,20-trione
19-norprogesterone
$\Delta^4$-pregnen-11$\alpha$,17$\alpha$,21-triol-3,20-dione
21-methyl-16$\alpha$-fluoro-$\Delta^4$-pregnen-17$\alpha$,21-diol-3,20-dione
21-fluoro-$\Delta^4$-pregnen-17$\alpha$,21-diol-3,11,20-trione
$\Delta^4$-cholesten-3-one
11$\beta$-hydroxyprogesterone
3 - (3 - keto-17$\alpha$-hydroxy-$\Delta^4$-androsten-17$\alpha$-yl)propionic acid $\gamma$-lactone Except as indicated, the above $\Delta^4$-3-ketosteroids are known in the art and may be prepared by standard procedures. The corresponding 3-keto-sapogenins are prepared by reaction of the corresponding sapogenin with aluminum isopropoxide or aluminum tert-butoxide in the presence of a hydrogen acceptor such as acetone or cyclohexanone in an inert organic solvent such as benzene, toluene or xylene. An exemplary sapogenin is diosgenin. Sarsasapogenin, tigogenin, smilagenin and neotigogenin may be converted to the corresponding 3-keto compounds and a double bond introduced at the 4-position by known methods.

It is also intended to include esters of the above mentioned compounds with such acids as acetic, benzoic, propionic, butyric, caproic, cyclopentylpropionic, hemisuccinic and other hydrocarbon carboxylic acids having from one to ten carbon atoms.

The 3-enol esters used as starting compounds in the present process are prepared by procedures known to those skilled in the art. It is generally preferred to employ lower alkanoates e.g. acetate as the 3-enol derivative in the present process. Of course, a variety of esters may be used in the present process but the aforementioned are preferred since they are readily preparable and economical. The starting enol ester may be employed in the present process in the purified state. Alternatively, if desired, the enol derivative may be prepared in a suitable reaction medium and converted in situ, to the desired 6-fluoro-$\Delta^4$-3-ketosteroid.

Many of the 6-fluorosteroids produced by the process of the present invention are useful as therapeutic agents as described in the following U.S. Patents:

| U.S. 2,838,496 | U.S. 2,838,540 |
| U.S. 2,838,498 | U.S. 2,838,541 |
| U.S. 2,838,499 | U.S. 2,838,544 |
| U.S. 2,838,502 | U.S. 2,838,545 |
| U.S. 2,838,528 | U.S. 2,838,547 |
| U.S. 2,838,546 | U.S. 2,838,548 |
| U.S. 2,838,536 | | and subsequently issued patents. Others are useful as intermediates in the preparation of other therapeutically effective 6-fluorosteroids. For example 6-fluoro-Compound S may be converted to 6-fluorohydrocortisone by 11$\beta$-hydroxylation with a microorganism of the genus Curvularia, as described in U.S. Patent 2,658,023. The present products may also be dehydrogenated to $\Delta^{1,4}$-steroids by the enzymes of an organism of the Protaminobacter genus as described in U.S. Patent 2,876,171. Other conversions of the present products are known to those skilled in the art.

Perchloryl fluoride, the reagent of the present process is described in the literature, for example, J. Amer. Chem. Soc. 80 (p. 6533).

The epimerization of 6$\beta$-fluoro- to 6$\alpha$-fluoro-steroids is brought about by methods known in the art. Generally, it is effected by treating the 6$\beta$-fluorosteroid with a solution of an acid or base in an appropriate solvent, such as acetic acid, chloroform or lower alkanols, e.g., methanol or ethanol. For example, the 6$\beta$-fluorosteroid is treated with hydrogen chloride in acetic acid to obtain the 6$\alpha$-fluorosteroid. Hydrogen chloride in chloroform, or potassium hydroxide in methanol in certain cases, may also be used for this purpose.

The following examples are given by way of illustration and are not to be construed as limitations of this invention many variations of which are possible without departing from the scope and spirit thereof.

EXAMPLE I

*6$\beta$-fluoro-$\Delta^{4,9(11)}$-pregnadien - 17$\alpha$,21 - diol - 3,20 - dione-17,21-diacetate*

To a solution of 5 g. of 3,17$\alpha$,21-tri-acetoxy-$\Delta^{3,5,9(11)}$-pregnatriene-20-one in 80 ml. of acetone is added a solution of 2 g. of potassium acetate in 50 ml. of dry ethanol. A stream of perchloryl fluoride is bubbled through the solution with stirring for one hour at room temperature. The mixture is filtered and the filtrate diluted with 900 ml. of water with cooling and stirring. The white crystalline product is filtered and washed with water to give 3.7 g. of product, m. 201–203° C. (d.).

The product is epimerized to the 6$\alpha$ isomer without further purification.

EXAMPLE II

*6β-fluoro-Δ⁴-pregnen-17α,21-diol - 3,20 - dione - 17α,21-diacetate*

A mixture of 4 g. of 3,17α,21-tri-acetoxy-Δ³,⁵-pregnadien-20-one in 120 ml. of 25% aqueous acetone is treated with perchloryl fluoride in a pressure bottle with shaking at 50 p.s.i for 15 minutes. The product obtained by filtration and subsequent concentration and filtration of the reaction mixture is washed with 20% aqueous acetone.

The product is epimerized to the 6α-isomer by treatment with hydrogen chloride in acetic acid.

EXAMPLE III

*6β-fluoro - 16α - 17α - oxido-Δ⁴ - pregnen - 17α,21 - diol-3,20-dione-17α,21-diacetate*

To a mixture of 5 g. of 3,17α,21-tri-acetoxy-16α,17α-oxido-Δ³,⁵-pregnadiene-20-one in 120 ml. of acetone containing 2 ml. of pyridine is added gaseous perchloryl fluoride with stirring for one hour at room temperature. The reaction mixture is then concentrated at reduced pressure and the residue recrystallized from ethanol to obtain the crystalline product.

EXAMPLE IV

*6β-fluoroprogesterone*

The procedure of Example I is repeated employing 3-acetoxy-Δ³,⁵-pregnadien-20-one as starting compound to obtain the product. The product is epimerized to 6α-fluoroprogesterone by standard procedures.

EXAMPLE V

*6β-fluoro - Δ⁴ - pregnen - 17α,21 - diol - 3,11,20 - trione-17α,21-diacetate*

The procedure of Example I is repeated employing 3,17α,21-triacetoxy-Δ³,⁵-pregnadien-11,20 - dione as the starting material to obtain the product.

EXAMPLE VI

The procedure of Example II is repeated employing 2 g. of sodium acetate in 150 ml. of ethanol in lieu of aqueous acetone with comparable results.

This procedure is repeated with other alkali metal salts of organic carboxylic acids; lithium propionate, sodium benzoate, sodium succinate, lithium acetate, potassium caproate and the like, with comparable results.

EXAMPLE VII

The procedures of the above examples are repeated to prepare the following 6β-fluoro-Δ⁴-3-ketosteroids in the form of the corresponding esters where the steroid contains an esterifiable alcohol group. This tabulation is given to avoid undue repetition of experimental procedures.

6β-fluoro-Δ⁴-androstene-3,11,17-trione
6β-fluoro-Δ⁴-androsten-17β-ol-3-one
6β-fluoro-19-nortestosterone
6β-fluoro-Δ⁴-androsten-3,17-dione
6β-fluoro-Δ⁴-pregnen-17α,21-diol-3,20-dione
6β-fluoro-Δ⁴-androsten-17α-ol-3-one
6β-fluoro-16α,17α-oxidoprogesterone
6β-fluoro-9α-fluorocortisone
6β-fluoro-Δ⁹⁽¹¹⁾-progesterone
6β,16α-difluorocortisone
6β-fluoro-16α-methylcortisone
6β-fluoro-Δ⁴-pregnen-21-ol-3,20-dione
6β-fluoro-9β,11β-oxido-Δ⁴ - pregnen - 16α,17α,21 - triol-3,20-dione
6β-fluoro - 2α - methyl - 9β,11 - oxido - Δ⁴ - pregnen-17α, 21-diol-3,20-dione
6β-fluoro-Δ⁴,¹⁷⁽²⁰⁾-pregnadiene-21-ol-3-one
6β-fluoro-Δ⁴-pregnen-3,20-dione
6β-fluoro-Δ⁴-pregnen,11β,17α,21-triol-3,20-dione
6β-fluoro-Δ⁴-pregnen-17α,21-diol-3,11,20-trione
6β-fluoro-Δ⁴,⁹⁽¹¹⁾-pregnadiene-17α,21-diol-3,20-dione
6β-fluoro-16α,17α-oxido-Δ⁴-pregnen-21-ol-3,20-dione
6β-fluoro-Δ⁴-androsten-17α-ol-3-one
6β-fluoro-17β-pyruvoyl-Δ⁴-androsten-17α-ol-3,11-dione
6β-fluoro-17α-hydroxyprogesterone
6β-fluoro-9α-bromo-Δ⁴-pregnen-3,11,20-trione
6β-fluoro-19 norprogesterone
6β-fluoro-Δ⁴-pregnen-11α,17α,21-triol-3,20-dione
6β-fluoro-21-methyl - 16α - fluoro - Δ⁴ - pregnen-17α,21-diol-3,20-dione
6β,21-difluoro-Δ⁴-pregnen-17α,21-diol-3,11,20-trione
6β-fluoro-Δ⁴-cholesten-3-one
6β-fluoro-11β-hydroxyprogesterone
6β-fluoro-3-keto-Δ⁴-derivative of diosgenin

EXAMPLE VIII

The procedure of Example III is repeated employing, in lieu of pyridine, the following tertiary amines: triethylamine, N-methylpyrollidine, N,N-dimethylbenzylamine, trimethylamine and N-methylpiperidine with comparable results.

In addition to acetone and ethanol, other suitable solvents are methanol, dioxane, tetrahydrofuran, diglyme (dimethyl ether of diethylene glycol), methyl ethyl ketone and the like.

Ultraviolet absorption analysis of the 6β-fluoro compounds of the above examples show a characteristical λ max. at or about 233 mμ.

The 3-enol esters are prepared according to the procedure described in The Journal of the American Chemical Society 73, 4496 (1951).

The method of epimerizing the above described 6β-fluorosteroids to the corresponding 6α-fluorosteroids is described in Tetrahedron, vol. 3, pages 14 to 27 (1958).

This application is a continuation-in-part application of copending application, Serial Number 815,312, filed May 25, 1959, now abandoned.

What is claimed is:

1. A process for the production of 6β-fluorosteroids which comprises contacting a 3-enol ester of a steroid selected from the group consisting of 1,2,6,7-tetrahydro-Δ⁴- pregnen - 3 - ones, 1,2,6,7-tetrahydro-Δ⁴-androsten-3-ones, 1,2,6,7-tetrahydro-3-keto-Δ⁴-cholestenes and 1,2,6,7-tetrahydro-3-keto-Δ⁴-sapogenins with at least an equimolar amount of perchloryl fluoride in a reaction inert organic solvent in the presence of at least an equivalent amount of a nucleophilic catalyst selected from the group consisting of water, hydrocarbon tertiary amines and alkali metal salts of lower alkanoic acids.

2. A process as in claim 1 wherein the enol ester is an acetate.

3. A process as in claim 1 wherein a temperature of from about −30° C. to about 50° C. is employed.

4. A process as in claim 1 wherein at least a 100% excess of catalyst is employed.

5. A process as in claim 1 wherein the catalyst is an alkali metal salt of acetic acid.

6. A process as in claim 1 wherein the catalyst is pyridine.

References Cited in the file of this patent

Gabbard et al.: J. Org. Chem., 23, page 1406 (1958).
Kissmann et al.: J. Am. Chem. Soc., vol. 81, page 1262 (1959).